United States Patent [19]

Jordan

[11] Patent Number: 5,150,404
[45] Date of Patent: Sep. 22, 1992

[54] PUBLIC TELEPHONE VOLUME CONTROL

[76] Inventor: H. Weaver Jordan, 2189 N.W. 53rd St., Fort Lauderdale, Fla. 33309

[21] Appl. No.: 706,160

[22] Filed: May 28, 1991

[51] Int. Cl.$^5$ .................... H04M 1/60; H04M 17/02
[52] U.S. Cl. .................................. 379/155; 379/52; 379/395; 340/825.19; 381/109
[58] Field of Search ................. 379/155, 52, 390, 395; 340/825.19; 381/109

[56] References Cited

U.S. PATENT DOCUMENTS 4,466,120  8/1984  Walker et al. .................... 379/52 X
4,773,088  9/1988  Matheny ........................... 379/52 X Primary Examiner—Stafford D. Schreyer
Attorney, Agent, or Firm—Oltman and Flynn

[57] ABSTRACT

A volume control for a telephone having a receiver, a manual key for generating a volume increment for each operation of the key; a volume increment counter connected to the manual key for counting volume increments; a controlled gain amplifier connected ahead of the receiver; and a gain control network connected between the controlled gain amplifier and the counter for controlling the gain of the amplifier in response to the number of volume increments counted in the volume increment counter. A unique feature of the volume control is that it maintains the selected gain level when the central office collects or refunds coins or makes an initial rate or coin present test.

7 Claims, 4 Drawing Sheets

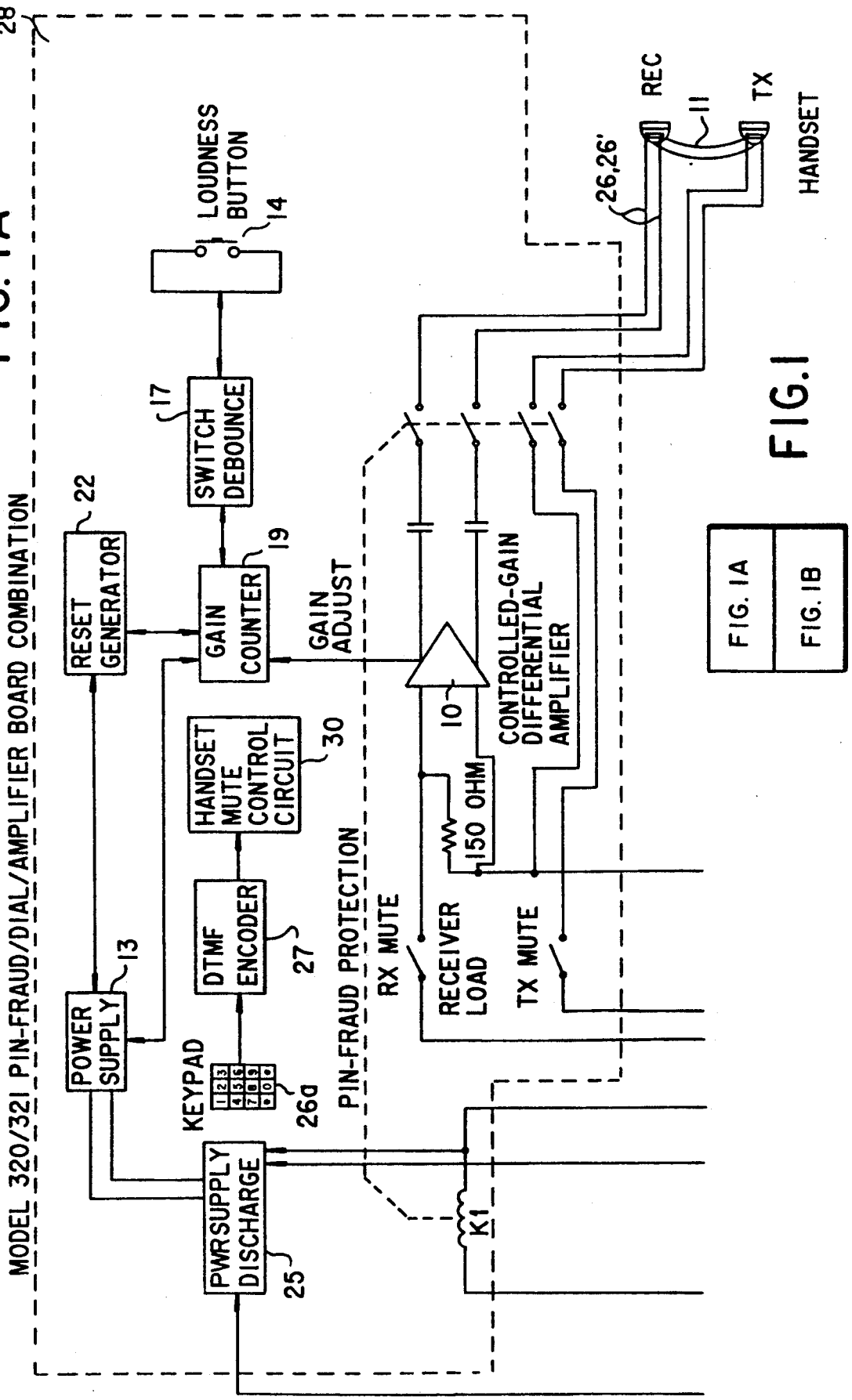

PUBLIC TELEPHONE VOLUME CONTROL

The invention relates to a volume control for public telephones, and more particularly a tamper-proof volume control for hearing-impaired persons, with automatic reset.

BACKGROUND AND PRIOR ART

In telephones that are occasionally used by hearing-impaired persons, it is usually necessary to have a special amplifying arrangement that increases the receive level to a level that is convenient for the hearing-impaired persons.

Various arrangements have been used to help hearing impaired persons use a telephone. Well known, for example, has been a magnetic pickup coil connected to a hearing aid, which could be attached to a certain marked location on the handset and provide the hearing impaired person with a satisfactory hearing level.

Other arrangements are known, wherein a volume amplifier with a volume control dial is placed in the handset of a coin telephone and controls the gain of a hearing amplifier in the telephone circuit. Such volume controls are frequently vandalized and the dial broken off, and it has the further drawback that unless the volume control is turned down after use, the next user of the phone may have his eardrums blasted with an excessive sound level when the phone is answered.

It is therefore an object of the instant invention to provide a volume control for public telephones that is virtually vandal proof and returns to normal hearing level after use by a hearing-impaired person.

SUMMARY OF THE INVENTION

In accordance with the invention there is provided a volume control for a telephone having a receiver, a manual key for generating a volume increment for each operation of the key; a volume increment counter connected to the manual key for counting volume increments; a controlled gain amplifier connected ahead of the receiver; and a gain control network connected between the controlled gain amplifier and the counter for controlling the gain of the amplifier in response to the number of volume increments counted in the volume increment counter.

In accordance with a further feature there is provided a volume control which includes a hookswitch in the telephone, and a count reset input on the volume increment counter connected to the hookswitch for resetting said volume increment counter to a count of zero upon operation of the hookswitch.

In accordance with another feature, there is provided a volume control wherein the volume increment counter is a recycling counter that resets to zero count after a given number of counts entered into the counter. counts entered into the counter.

A unique feature of the volume control is that it maintains the selected gain level when the central office collects or refunds coins or makes an initial rate and coin present test.

The volume control according to the invention may further include a pulse conditioning circuit connected between the manual key and the counter for generating a conditioned single pulse for each operation of the manual key; and the volume control may further include a plurality of gain control resistors in the gain control network and a respective gain control transistor connected with each gain control resistor, wherein each gain control transistor has a gain control input connected to a respective counter output for changing state of the transistor in response to changing the count in the counter.

According to a concomitant feature, the volume control with all its components is mounted on the coin telephone's dial board with a common power supply.

Further objects and advantages of this invention will be apparent from the following detailed description of a presently preferred embodiment which is illustrated schematically in the accompanying drawings.

BRIEF DESCRIPTION OF THE DRAWINGS

FIGS. 1A, 1B are a typical block diagram of a public telephone, in particular a coin telephone, showing the volume control ahead of the handset receiver.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1B:
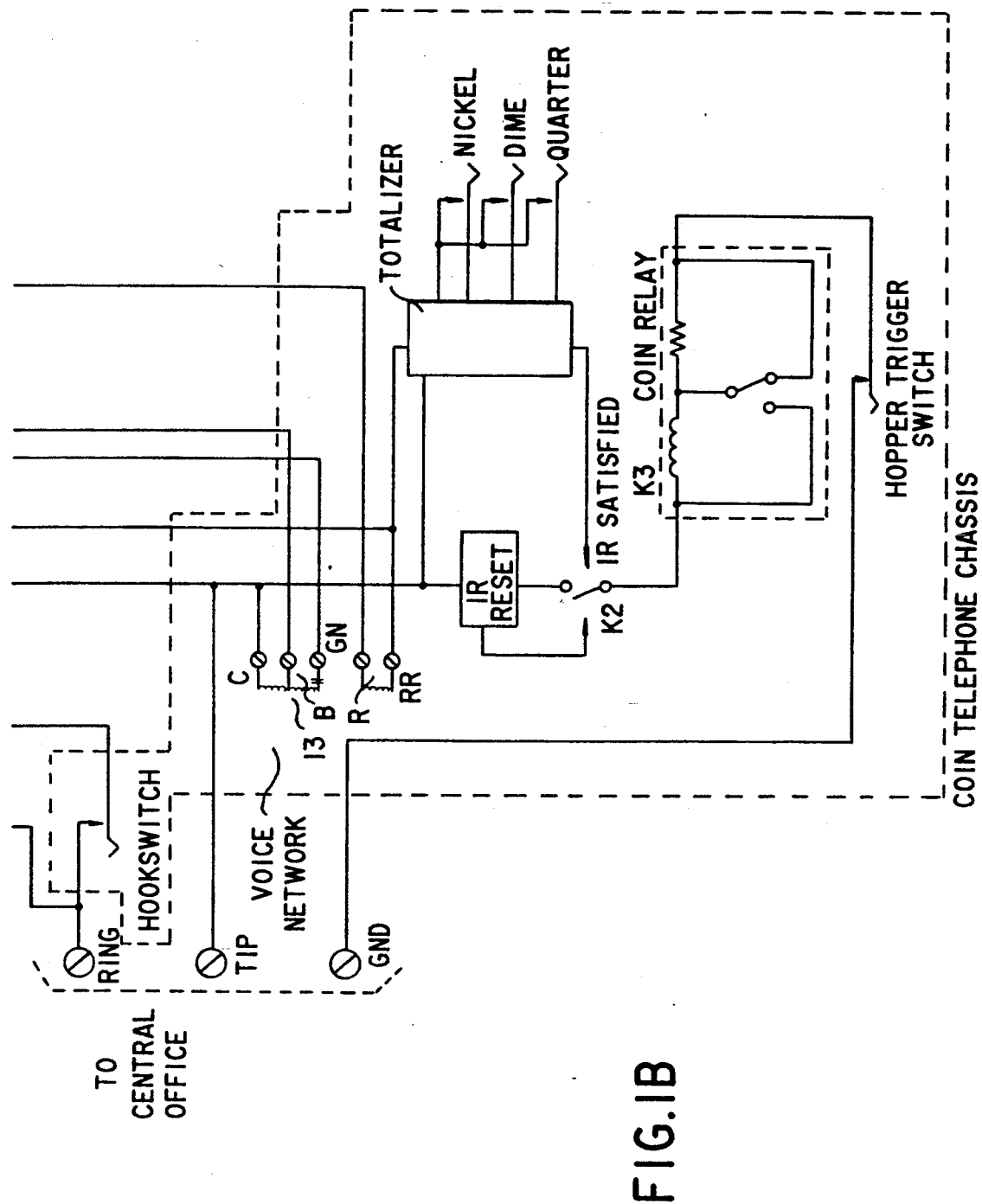
Figures 2, 2A:
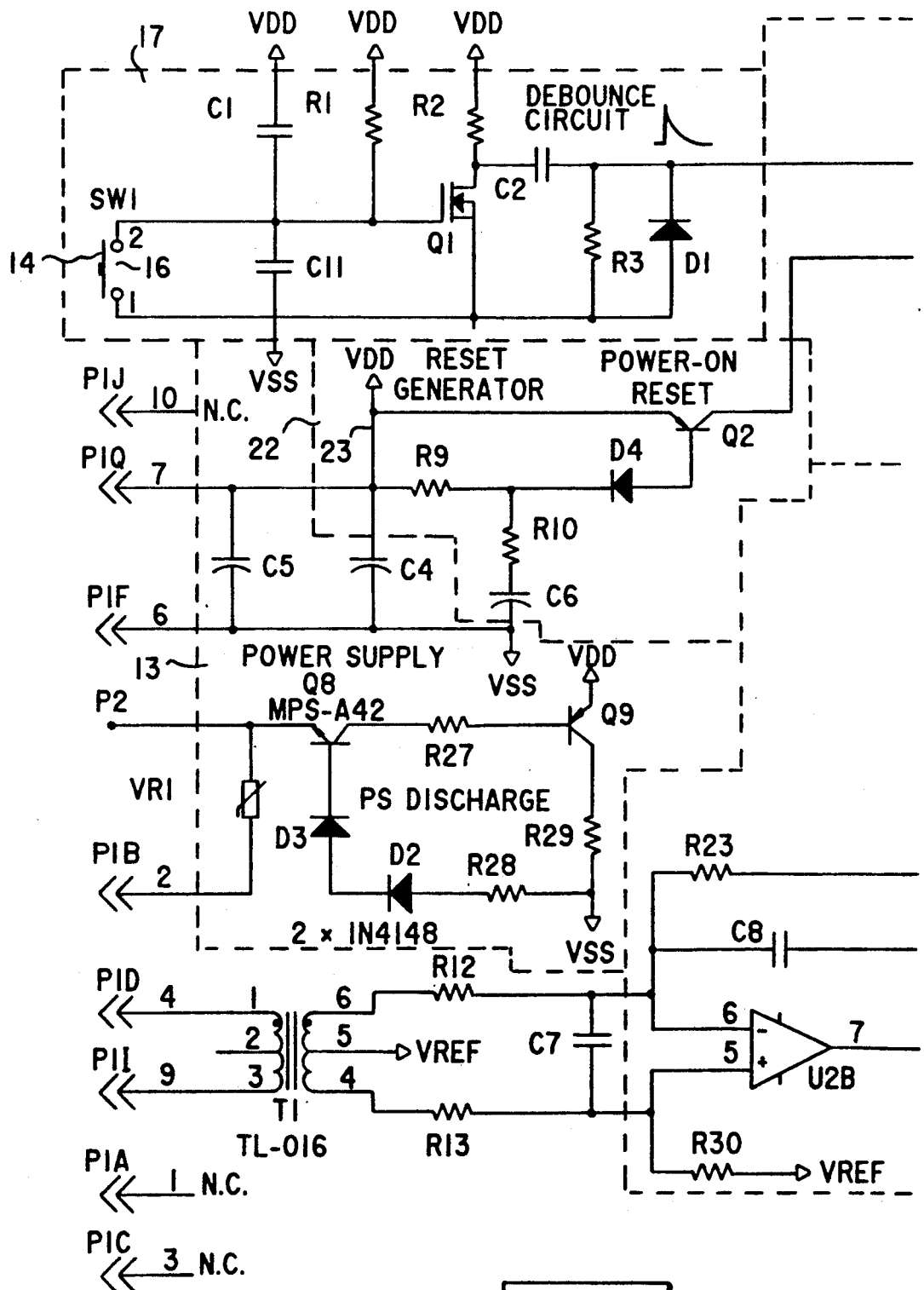
FIG. 2, 2A, 2B are a circuit diagram of the volume control circuit and other related parts.
Figure 2B:
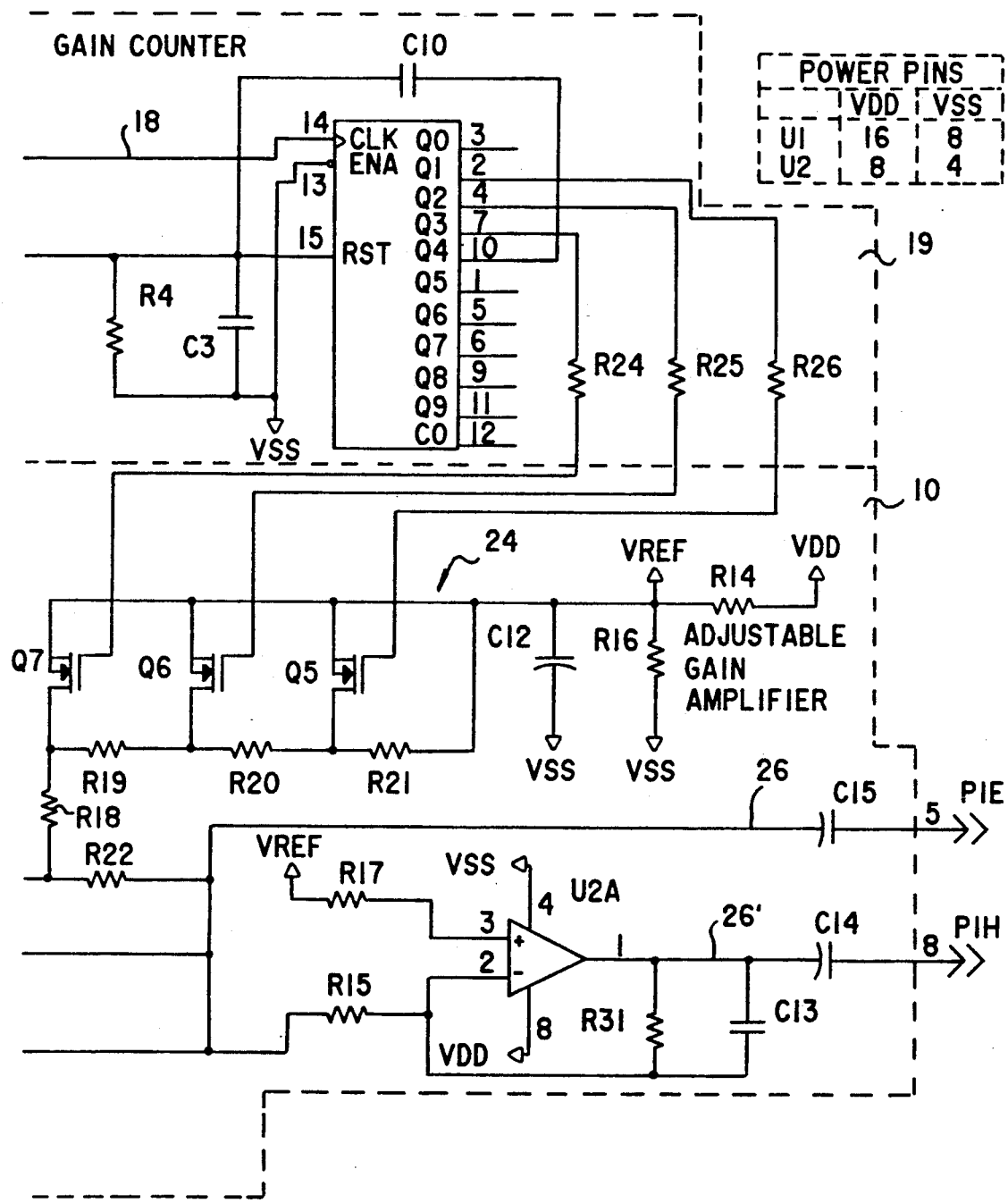

FIG. 1 is a block diagram of a public telephone, especially in the form of a coin telephone, showing the major elements of such a telephone. A general description of such a telephone is found in U.S. patent application Ser. No. 07/509,859 having the same inventor as the instant application, which has now been allowed but not issued. Of particular interest to the instant application is the amplifier 10 shown inserted ahead of the receiver REC in the handset 11 and the power-on reset lead 12 from the power supply 13. FIG. 2 shows details of the volume control circuit.

In FIGS. 1 and 2, a manual key 14, advantageously in the form of a non-locking push key, of sturdy construction, is connected with its contacts 16 between the input of a pulse debounce and conditioning circuit 17, including a capacitor-resistor input network C1, C11 and R1 which applies a given time constant to the input of an FET transistor Q1. The time constant insures that contact bounce of the manual switch 14 is eliminated so that upon operating the switch 14 only a single pulse is delivered from the transistor output via capacitor C2, as the transistor is turned off when its input is grounded by switch 14.

Each output pulse on lead 18 is connected to the input CLK of a gain counter circuit 19 with a counter chip 21 of any conventional construction. The counter chip 21 is always reset to zero by a reset generator circuit 22, which has a transistor Q2 with its emitter connected to power supply lead 23 (VDD). When the hookswitch goes on-hook the power supply 13 is quickly discharged by a discharge circuit formed of transistors Q8, Q9 of which transistor Q9, connected between power lead VDD 23 and ground reference VSS, discharges capacitor C5 in the power supply 13.

After the counter chip 21 has been reset at reset pin RST from the collector of transistor Q2, each operation of the switch 14 advances the counter chip 21 one count, wherein each count represents a volume increment. In the reset position, counter output Q1, Q2, Q3 are low, turning off transistors Q7, Q6 and Q5 in the gain control network generally at 24, providing maximum negative feedback between the output pin 7 of amplifier U2B and its negative input pin 6. With maximum negative feedback the gain is lowest, and accordingly the receive volume is lowest.

After receipt of the first counting pulse, pin Q1 of counter 21 goes high, turning on transistor Q5, which provides a lower negative feedback than before receipt of count 1, due to the dividing effect of resistors R22, R23 shunted to ac-ground through resistors R18, R19 and R20. The gain with the receive volume therefore goes up one increment.

After receipt of the second counter pulse, transistor Q5 is turned off, and transistor Q6 is turned on, which introduces a still lower feedback level through resistor R19, which is selected such that the gain increases another increment, to the next highest level with the chosen choice of four levels of receiver volume. After the fourth pulse, the transistor Q6 is turned off, i.e. both transistors Q5 and Q6 are turned off and only transistor Q7 is turned on with only resistor R18 shunting the negative feedback path to a-c ground, resulting in the highest receiver volume due to still lower feedback. Another input pulse from switch 14 returns the counter chip 21 back to zero count with a reset pulse coupled through C10 and the volume goes back to its lowest level.

As a result, the voice volume received at leads 26 and 26' from the voice network 13 can be adjusted in four volume levels in the controlled gain amplifier circuit 10 by means of the manual switch 14 so that persons of limited hearing capacity can choose any one of the four levels.

It follows that the volume level and number of volume levels is an arbitrary choice, and that any other number of volume levels may be chosen, as best suited for the application.

The actual volume level at each step is programmable at the manufacture of the amplifier.

The controlled gain amplifier 10 with the key 14 is advantageously mounted on a common mounting base 28 also used for mounting the keypad 26a, the DTMF encoder 27, the power supply 13, and other components relating to the above elements as shown in FIG. 2. The advantage of co-locating these elements stems from the fact that the conventional base for the keypad 26a and the DTMF encoder 27 is usually made readily detachable in public telephones, so that a faulty keypad that has been damaged by voltage surges, such as lightning, can be replaced in the field. By combining the keypad and its related elements with the components of the volume control, these components also become readily field replaceable. The base 28 is usually composed of a sturdy metal front plate holding the pushbuttons of the keypad which can also hold the push key 14 so that it is sturdily mounted and is less exposed to vandalism. Additionally it is advantageous that the components keypad 26a, DTMF encoder 27 and the volume control components amplifier 10, switch debounce circuit 17, gain counter 19, power supply discharge circuit 25, handset mute control 30 and reset generator 22 can all share a common power supply 13, which clearly leads to a more cost effective construction.

I claim:

1. A volume control for a telephone having a receiver, comprising a manual key for generating a volume increment for each operation of the key; a volume increment counter connected to said manual key for counting volume increments; a controlled gain amplifier connected ahead of said receiver; a gain control network connected between said controlled gain amplifier and said counter for controlling the gain of said amplifier in response to the number of volume increments counted in said volume increment counter, a mounting base for mounting at least said controlled gain amplifier, said volume increment counter and said manual key, and a power supply commonly connected to at least said controlled gain amplifier, said volume increment counter and said DTMF encoder.

2. A volume control according to claim 1, including a hookswitch in said telephone, and a count reset input on said volume increment counter connected to said hookswitch for resetting said volume increment counter to a count of zero upon operation of said hookswitch.

3. A volume control according to claim 1, wherein said volume increment counter is a recycling counter that resets to zero count after a given number of counts entered into the counter.

4. A volume control for a telephone having a receiver, comprising a manual key for generating a volume increment for each operation of the key; a volume increment counter connected to said manual key for counting volume increments; a controlled gain amplifier connected ahead of said receiver; a gain control network connected between said controlled gain amplifier and said counter for controlling the gain of said amplifier in response to the number of volume increments counted in said volume increment counter and a pulse conditioning circuit connected between said manual key and said counter for generating a conditioned single pulse for each operation of said manual key.

5. A volume control according to claim 1, including a plurality of gain control resistors in said gain control network and a respective gain control transistor connected with each gain control resistor, each gain control transistor having a gain control input connected to a respective counter output, for turning on said transistor in response to the count in said counter.

6. A volume control according to claim 1, wherein said telephone is a coin telephone.

7. A volume control according to claim 1, including a keypad and a DTMF encoder connected to said keypad mounted on said mounting base.

* * * * *